United States Patent [19]

Eftefield

[11] 4,074,896
[45] Feb. 21, 1978

[54] CUSHION COMPRESSION STRUTS FOR BULLDOZER BLADES

[75] Inventor: Larry G. Eftefield, Joliet, Ill.

[73] Assignee: Caterpillar Tractor Co., Peoria, Ill.

[21] Appl. No.: 671,640

[22] Filed: Mar. 29, 1976

[51] Int. Cl.$^2$ ............................................. B60G 11/22
[52] U.S. Cl. ................................... 267/139; 280/481; 172/803
[58] Field of Search ............... 267/136, 137, 140, 152, 267/63 R, 153; 213/40 R, 41; 172/801, 803; 280/481

[56] References Cited

U.S. PATENT DOCUMENTS

| 3,243,203 | 3/1966 | Kermiz et al. | 280/481 |
| 3,265,380 | 8/1966 | Hall et al. | 172/801 |
| 3,537,696 | 11/1970 | Webster, Jr. | 267/63 R |
| 3,858,665 | 1/1975 | Winker | 172/803 |
| 3,977,699 | 8/1976 | Wagatsuma | 280/481 |

Primary Examiner—James B. Marbert
Attorney, Agent, or Firm—Phillips, Moore, Weissenberger, Lempio & Majestic

[57] ABSTRACT

A bulldozer blade has operatively connected therewith compression struts which include resilient means for cushioning the shock of impact applied to the blade. Each strut includes cylinder means, rod means reciprocal relative thereto, and a piston mounted on the rod within the cylinder means. First cushioning means cushion initial movement of the rod inward of the cylinder, and subsequent movement of the rod inward of the cylinder is cushioned by the first cushioning means and also second cushioning means. Rebound movement of the rod relative to the cylinder means is cushioned by third cushioning means.

7 Claims, 2 Drawing Figures

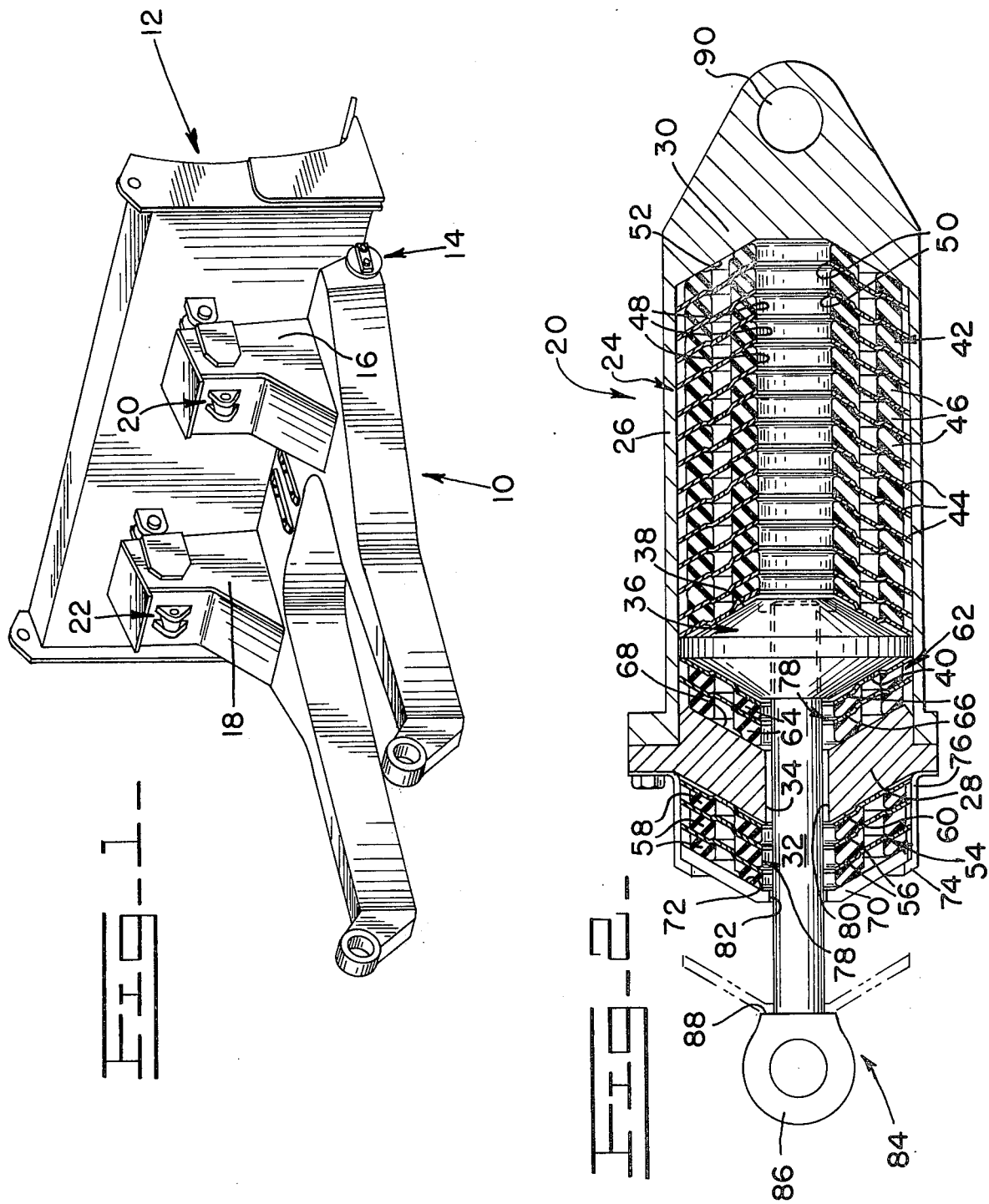

CUSHION COMPRESSION STRUTS FOR BULLDOZER BLADES

BACKGROUND OF THE INVENTION

This invention relates to bulldozers which include resilient means to cushion the shock of impact applied to the bulldozer blade.

Various resilient cushioning means in association with a bulldozer blade or the like are known. For example, see U.S. Pat. Nos. 3,158,944; 3,265,380 (both assigned to the assignee of this invention); 2,986,827; and 3,279,105. Initially, it is to be noted that in each of these systems, single cushioning means absorb the impact on the blade over the full rearward travel of the blade. It has been deemed desirable under certain applications that the initial movement of the blade under impact be controlled by a cushioning means, with further movement of the blade under impact being controlled by additionally cushioning means, for better control of the impact applied to the blade. Clearly, none of the systems of the patents cited above include such characteristics.

Additionally, it has been found desirable to also include cushioning means for cushioning rebound actions of the blade. Such a feature adds to the overall proper control of cushioning of impact on the blade.

SUMMARY OF THE INVENTION

It is accordingly an object of this invention to provide means for use with a bulldozer blade which resists initial movement under impact of the bulldozer blade through first cushioning means, and subsequent movement of the bulldozer blade under impact by additional second cushioning-means.

It is a further object of this invention to provide means which, while fulfilling the above object, include means for cushioning rebound impact of the bulldozer blade.

It is a still further object of this invention to provide means which, while fulfilling the above objects, is extremely simple in design and effective in use.

Broadly stated, the invention comprises apparatus for cushioning shock impact to a bulldozer blade or the like, comprising a body, and a rod means movable relative to the body in one and the other directions. Piston means are fixed relative to the rod means. First cushioning means and second cushioning means are operatively positioned with respect to the body, the piston means, and the rod means so that movement of the rod means in one direction relative to the body is resisted initially by the first cushioning means, and subsequently by the second cushioning means.

BRIEF DESCRIPTION OF THE DRAWINGS

These and other objects of the invention will become apparent from a study of the following specification and drawings, in which:

FIG. 1 is a perspective view of a bulldozer blade incorporating the invention; and, FIG. 2 is a sectional view of the cushioning apparatus as used in FIG. 1.

DESCRIPTION OF THE PREFERRED EMBODIMENT

Shown in FIG. 1 is apparatus 10 associated with the forward end of a tractor, for supporting a blade 12. The blade 12 is carried on such apparatus 10, being pivotally connected to lower portions of the apparatus as at 14. Upwardly-extending portions 16, 18 of the apparatus 10 are included, and a pair of cushioning struts 20, 22 interconnect the upwardly-extending portions 16, 18, respectively, and the blade 12.

One of such cushioning struts 20 is shown in FIG. 2, it being understood that the other cushioning strut 22 is identical in configuration.

As shown in FIG. 2, the apparatus 20 includes a body 24 in the form of cylinder means which in turn includes a cylinder body 26 and end portions 28, 30 secured relative to the cylinder body 26. A rod 32 extends through an aperture 34 in the end portion 28, and has a piston 36 secured to the inner end thereof within the cylinder means 24 between the end portions 28, 30. The rod 32 is thus movable relative to the cylinder means 24 in one and the other directions.

The piston 36 defines first and second frustoconical surfaces 38, 40 on either side thereof, which are angled together outwardly of the central portion of the piston 36. First cushioning means 42 are positioned within the cylinder means 24 between the piston 36, and the end portion 30. The first cushioning means 42 are made up of a plurality of alternately arranged frustoconical metallic and elastomeric members 44, 46. The elastomeric members 46 are in generally nesting relation, and define individual passages 48 through the centers thereof, as do the metallic elements at 50. The frustoconical surfaces 38 of the piston 36 generally nests with the most-adjacent elastomeric member 46 of the first cushioning means 42, with a metallic member 44 being disposed therebetween. The end portion 30 defines a frustoconical surface 52 within which generally nests the most-adjacent elastomeric member 46 of the cushioning means 42.

Positioned outwardly of the end portion 28 and adjacent the rod means 32 are second cushioning means 54. The second cushioning means 54 are also made up of a plurality of alternately arranged frustoconical metallic and elastomeric members 56, 58. The elastomeric members 58 are again in generally nesting relation. The outer surface 60 of the end portion 28 is frustoconical in configuration, and the surface 60 is in generally nesting relation with the most-adjacent elastomeric member 58, with a metal member 56 actually being interposed therebetween.

Further included are third cushioning means 62 positioned within the cylinder means 24 between the piston 36 and the end portion 28, including alternately arranged frustoconical elastomeric members 64 and metallic members 66. Again, the elastomeric members 64 of the third cushioning means 62 are in generally nesting relation. The surface 40 of the piston 36 generally nests with the most-adjacent elastomeric member of the third cushioning means with a metallic member 66 being disposed therebetween. The end portion 28 defines a frustoconical surface 68, which is in nesting relation with the elastomeric member 64 most-adjacent thereto.

Another frustoconical metallic element 70, similar to the metallic elements 56, is positioned outwardly of the second cushioning means 54, with the surface 72 thereof in nesting relation with the elastomeric member 58 most adjacent thereto. Such metallic element 70 is retained by an annular lip 74 defined by a cap 76 secured to the end portion 28.

The elastomeric members 58, 64 and metallic members 56, 66 define passages 78 through the central portions thereof, and the end portion 28 and metallic element 70 also define central passages 80, 82 therethrough. The rod 32 is disposed through the passages 78, 80, 82.

The outer periphery of the metallic element 70 is in sliding relation with the inner surface of the cap 76, so that the metallic element 70 can be moved within the cap 76 generally along the longitudinal axis of the cylinder means 24. The rod 32 defines an end portion 84 in turn defining an eye 86 and a shoulder portion 88 which, upon sufficient movement of the rod 32 inwardly of the cylinder means 24, can contact the metallic element 70. The cylinder means end portion 30 defines an eye as shown at 90.

It is to be noted that the elastomeric members 46, 58, 64 of the first, second and third cushioning means 42, 54, 62 are identical in configuration. The metallic elements 44, 56, 66 of the first, second, and third cushioning means 42, 54, 62 are also identical in configuration. Each of the elastomeric members 46 of the first cushioning means 42 is positionally reversed with respect to the elastomeric members 54, 62 of the second and third cushioning means 54, 62.

In the use of such a cushion strut 20, the eye 86 is pivotally connected relative to the upwardly-extending portion 16 and the eye 90 is pivotally connected relative to the blade 12. At rest, the parts of the cushion strut 20 are as shown in FIG. 2. Upon shock impact to the bulldozer blade 12, tending to force the bulldozer blade 12 rearward, the rod 32 is moved relative to the cylinder means 24 inwardly thereof, such movement being resisted initially by the first cushioning means 42. Further movement of the rod 32 inward of the cylinder means 24 brings the shoulder 88 into contact with the metallic element 70 (shown in phantom), so that such further movement of the rod 32 is subsequently resisted by both the first and second cushioning means 42, 54. Upon rebound of the blade 12, the rod 32 tends to move outwardly of the cylinder means 24 under the force of the elastomeric members of the cushioning means 42 and cushioning means 54, until the surface 40 of the piston 36 contacts the third cushioning means 62, whereupon further movement of the rod 32 outward of the cylinder means 24 is resisted by the third cushioning means 62.

It will therefore be seen that appropriate control of shock impact applied to a bulldozer blade 12, and rebound of the bulldozer blade 12 exists.

What is claimed is:

1. Apparatus for cushioning shock impact to a bulldozer blade or the like, comprising:
   cylinder means comprising a cylinder body and first and second end portions secured relative thereto;
   rod means extending through the first end portion and movable relative to the cylinder means in one and the other directions;
   piston means secured to the rod means within the cylinder means between the first and second end portion thereof;
   first cushioning means positioned within the cylinder means between the piston means and second end portions; and
   second cushioning means positioned outwardly of the first end portion and adjacent the rod means, the first and second cushioning means providing that movement of the rod means in one direction relative to the cylinder means is resisted initially by the first cushioning means, and subsequently by the first and second cushioning means.

2. The apparatus of claim 1 and further comprising third cushioning means positioned within the cylinder means between the piston means and the first end portion, for resisting movement of the rod means in the other direction.

3. The apparatus of claim 2 wherein the first, second and third cushioning means comprise a plurality of substantially identical elastomeric members.

4. The apparatus of claim 3 wherein each of the elastomeric members comprise a generally frustoconically shaped elastomeric member, each of the elastomeric members defining a passage, the rod means being disposed through the passages of the elastomeric members of the second and third cushioning means.

5. The apparatus of claim 4 wherein the elastomeric members of the first cushioning means are in generally nesting relation, the elastomeric members of the second cushioning means are in generally nesting relation, and the elastomeric members of the third cushioning means are in generally nesting relation, and wherein each of the elastomeric members of the first cushioning means is positionally reversed with respect to the elastomeric members of the second and third cushioning means.

6. The apparatus of claim 5 wherein the piston means define first and second frustoconical surfaces on either side thereof and angled together outwardly of the central portion of the piston means, the first frustoconical surface of the piston means generally nesting with the most-adjacent frustoconically shaped elastomeric member of the first cushioning means, the second frustoconically shaped surface of the piston means generally nesting with the most-adjacent frustoconically shaped elastomeric member of the third cushioning means.

7. The apparatus of claim 6 wherein the first end portion defines a frustoconical surface within which generally nests the most-adjacent elastomeric member of the third cushioning means, and wherein the second end portion defines a frustoconical surface within which nests the most-adjacent elastomeric member of the first cushioning means.

* * * * *

Disclaimer 4,074,896.—*Larry G. Eftefield*, Joliet, Ill. CUSHION COMPRESSION STRUTS FOR BULLDOZER BLADES. Patent dated Feb. 21, 1978. Disclaimer filed Aug. 17, 1981, by the assignee, *Caterpillar Tractor Co.*

Hereby enters this disclaimer to claims 1, 2, 3 and 4 of said patent.

[*Official Gazette October 20, 1981.*]